(12) United States Patent
Rojas et al.

(10) Patent No.: US 8,104,778 B1
(45) Date of Patent: Jan. 31, 2012

(54) DUAL PURPOSE WHEELED CART APPARATUS

(76) Inventors: Joel Rojas, Yorkville, IL (US); Geraldo S. Rojas, Yorkville, IL (US)

( * ) Notice: Subject to any disclaimer, the term of this patent is extended or adjusted under 35 U.S.C. 154(b) by 336 days.

(21) Appl. No.: 12/499,246

(22) Filed: Jul. 8, 2009

(51) Int. Cl.
*B62B 1/22* (2006.01)
*B62B 1/24* (2006.01)

(52) U.S. Cl. ............ 280/47.27; 280/47.131; 248/98; 414/446

(58) Field of Classification Search ........ 280/47.18, 280/47.24, 47.26, 47.27, 47.131; 248/95, 248/97, 98, 99, 100; 414/444, 446
See application file for complete search history.

(56) References Cited

U.S. PATENT DOCUMENTS

| | | | |
|---|---|---|---|
| 725,721 A * | 4/1903 | Kenney | 248/97 |
| 2,455,729 A * | 12/1948 | Byers | 248/98 |
| 3,875,981 A | 4/1975 | Brenner et al. | |
| 4,202,521 A * | 5/1980 | Harding | 248/98 |
| 4,601,315 A | 7/1986 | France | |
| 4,697,834 A | 10/1987 | Scott | |
| 5,947,492 A * | 9/1999 | Hallberg, Jr. | 280/47.24 |
| 6,082,574 A | 7/2000 | Johnson | |
| 6,116,548 A * | 9/2000 | Oleson | 248/97 |
| 6,616,152 B2 * | 9/2003 | Oliver | 280/47.18 |
| 6,994,302 B1 * | 2/2006 | Simmons | 248/98 |
| 7,014,199 B2 * | 3/2006 | Hendzel | 280/47.35 |
| 7,686,260 B1 * | 3/2010 | Tetradis | 248/98 |

* cited by examiner

*Primary Examiner* — John Walters

(57) ABSTRACT

The dual purpose wheeled cart apparatus supports and transports a variety of cargo. The cart apparatus, in one mode, supports and transports specialized bags and easily converts from a bag transporter to a varied cargo transporter. The hopper, especially suited to bag filling, is removable via the sleeves attached to the hopper uprights and the sleeve mounts of the hopper, which slideably and removably fit into the sleeves. The hopper is available in various dimensions to especially suit various specific bags that are commonly used in refuse and lawn debris clean up. The apparatus cart and hopper support bags for filling and transport, thereby negating back strain and other issues that typically haunt those attempting to fill and carry large refuse bags. By supporting and transporting bags, only one person can do the jobs normally requiring two or more.

6 Claims, 5 Drawing Sheets

DUAL PURPOSE WHEELED CART APPARATUS

BACKGROUND OF THE INVENTION

While various forms of carts, sometimes referred to as dollies, exist, few if any are specialized for supportively holding debris bags, especially those dictated by various refuse collectors. And, none can perform the double function of properly supporting and transporting a debris bag, while easily converting to a more typical car function. One such debris bag, for example, is of a specified height, width, and depth and is typically used to bag yard and garden cuttings and debris. Companies almost always require that the user transport the specifically sized full bags to a curbside or the like. Filling and transporting such bags is quite difficult and laborious. Filling by only one person is extremely difficult as unsupported bags usually collapse and fall. Transporting a bag, once full, can either be difficult of totally impossible for one person. The present apparatus solves these problems with a dual purpose wheeled cart apparatus that fully supports and transports various bags and cargo.

FIELD OF THE INVENTION

The dual purpose wheeled cart apparatus relates to carts and dollies and more especially to an apparatus that doubles as a specialized cart for bag filling and transport and a cart more typically used to carry various cargo.

SUMMARY OF THE INVENTION

The general purpose of the dual purpose wheeled cart apparatus, described subsequently in greater detail, is to provide a dual purpose wheeled cart apparatus which has many novel features that result in an improved dual purpose wheeled cart apparatus which is not anticipated, rendered obvious, suggested, or even implied by prior art, either alone or in combination thereof.

To attain this, the dual purpose wheeled cart apparatus supports and transports a variety of cargo. One function of the cart apparatus is to support and transport specialized bags. The apparatus easily converts from a bag transporter to a varied cargo transporter. The hopper, especially suited to bag filling, is easily removable via the sleeves attached to the hopper uprights and the sleeve mounts of the hopper, which slideably and removably fit into the sleeves. The hopper is available in various dimensions to suit various specific bags that are commonly used in refuse and lawn debris clean up. Dimensions are critically important in properly supporting, filling, and transporting such bags.

The apparatus cart and hopper support bags for filling and transport, thereby negating back strain and other issues that typically haunt those attempting to fill and carry large refuse bags. By supporting and transporting bags, only one person can do the jobs normally requiring two or more.

Removal of the hopper provides a fairly typical cart for transporting other cargo, with the added advantage that the wheels are at least 12 inches in diameter to aid in rolling over rough or otherwise difficult terrain, whether with or without the hopper fitted. Further, the wheels are disposed rearwardly and laterally outside of the dimensions of the cart uprights and extended lip, thereby negating interference with various cart cargo items.

Thus has been broadly outlined the more important features of the improved dual purpose wheeled cart apparatus so that the detailed description thereof that follows may be better understood and in order that the present contribution to the art may be better appreciated.

An object of the dual purpose wheeled cart apparatus is to support and transport a variety of cargo.

Another object of the dual purpose wheeled cart apparatus is to support and transport specialized bags.

A further object of the dual purpose wheeled cart apparatus is to easily convert from a bag transporter to a varied cargo transporter.

A further object of the dual purpose wheeled cart apparatus is to support bags for filling.

Yet another object of the dual purpose wheeled cart apparatus is to provide for a single person to fill and transport bags.

An added object of the dual purpose wheeled cart apparatus is to roll easily over rough terrain.

And, an object of the dual purpose wheeled cart apparatus is to store additional bags and items.

These together with additional objects, features and advantages of the improved dual purpose wheeled cart apparatus will be readily apparent to those of ordinary skill in the art upon reading the following detailed description of presently preferred, but nonetheless illustrative, embodiments of the improved dual purpose wheeled cart apparatus when taken in conjunction with the accompanying drawings.

In this respect, before explaining the current embodiments of the improved dual purpose wheeled cart apparatus in detail, it is to be understood that the dual purpose wheeled cart apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved dual purpose wheeled cart apparatus. It is therefore important that the claims be regarded as including such equivalent constructions insofar as they do not depart from the spirit and scope of the dual purpose wheeled cart apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the dual purpose wheeled cart apparatus generally designated by the reference number 10 will be described.

Figure 1:
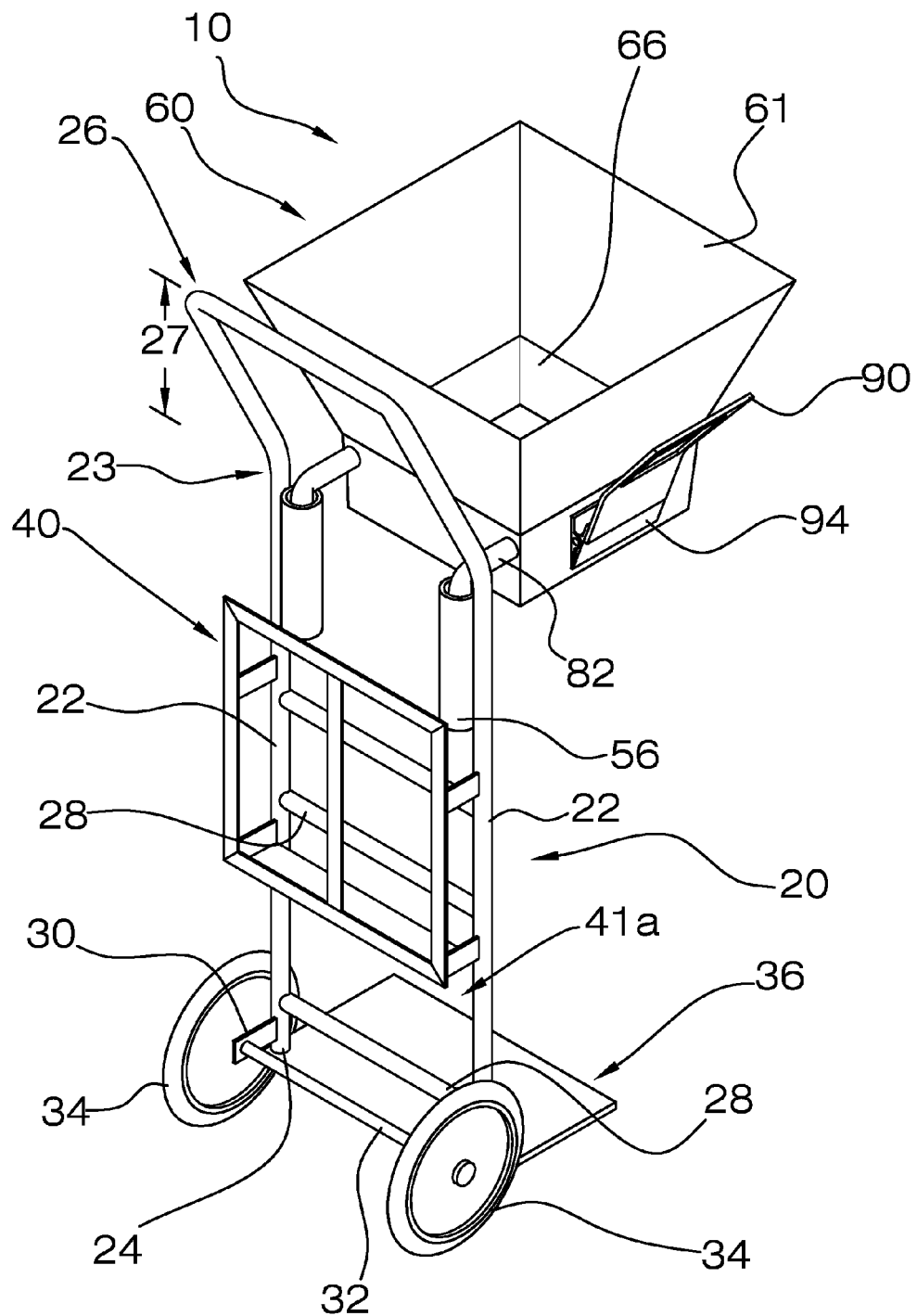
FIG. 1 is a perspective view.
Figure 2:
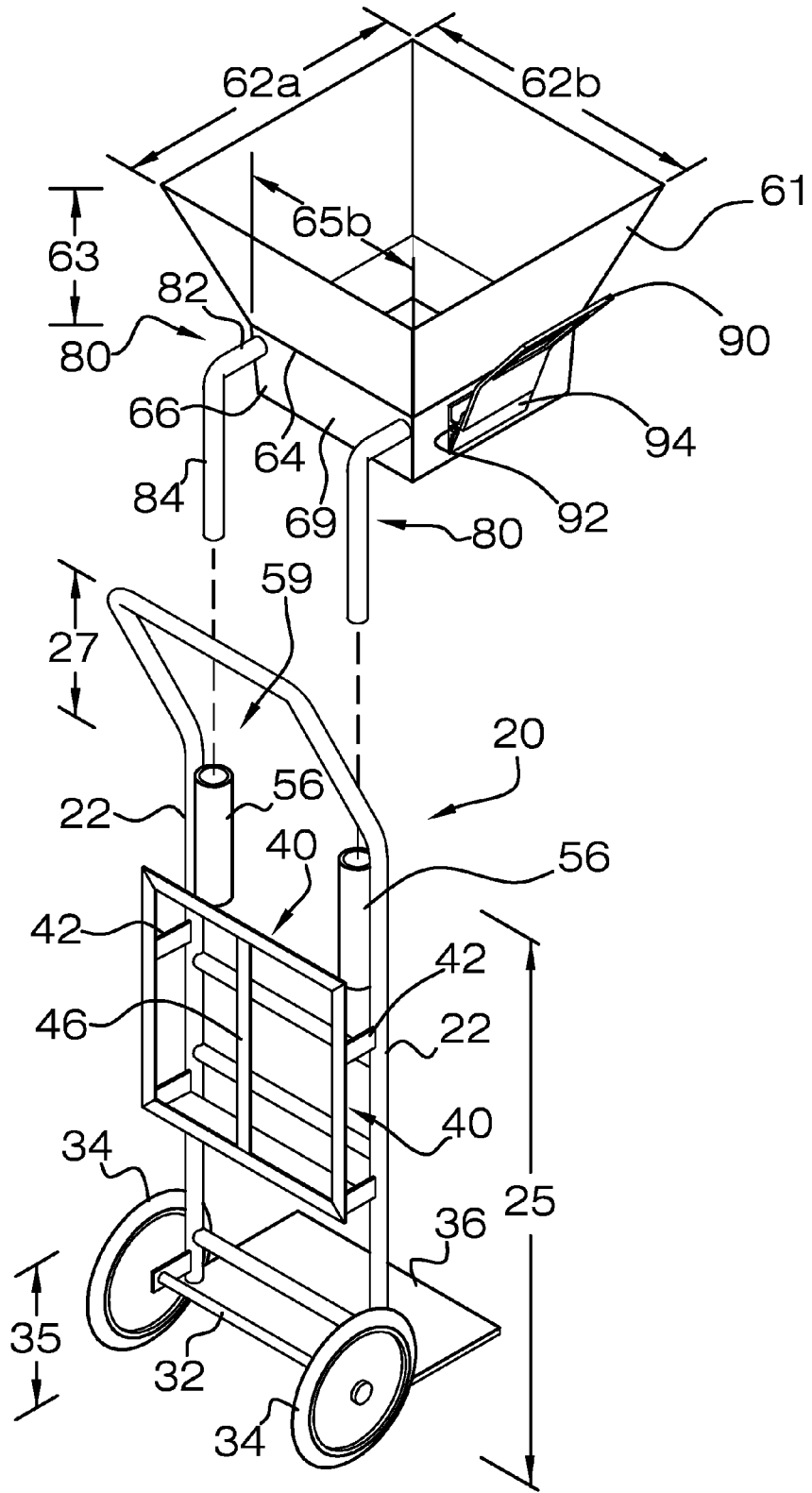
FIG. 2 is a perspective view, hopper removed.

Referring to FIGS. 1 and 2, the apparatus 10 partially comprises the cart 20 having a cart width 21 of about 21 inches. The cart 20 is partially comprised of the pair of identical spaced apart vertical uprights 22. Each upright 22 has an upright top 23 spaced apart from an upright bottom 24. The uprights 22 have an upright height 25 of about 36 inches. The rearwardly angled u-shaped handle 26 is disposed atop the upright tops 23. The angled handle 26 has a handle height 27 of about 12 inches. The trio of identical spaced apart crossbars 28 is disposed between the uprights 22. The pair of identical spaced apart sleeves 56 is provided. One of each sleeve 56 is disposed on the interior of one of each of the uprights 22. The sleeves 56 are adjacent to the upright tops 23. Each sleeve 56 has a sleeve diameter 59 of about ½ inch.

Figure 5:
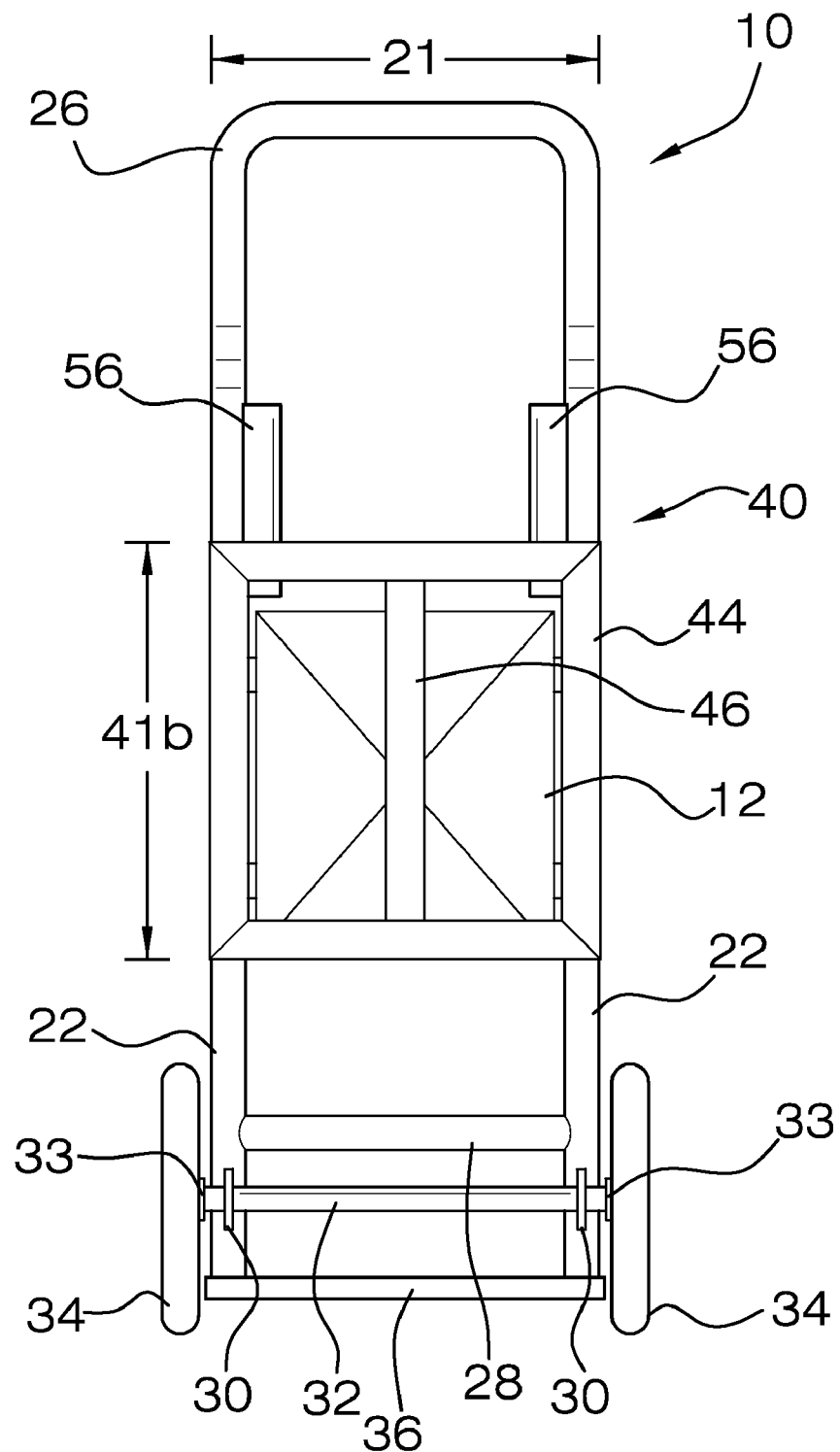
FIG. 5 is a rear elevation view, with hopper removed and additional bags in the bag holder.

Referring to FIG. 5 and continuing to refer to FIGS. 1 and 2, the bag holder 40 is attached rearwardly to the uprights 22. The bag holder 40 has a holder depth 41a of about 1½ inches and a holder height 41b of about 16 inches. The bag holder 40 provides for carrying additional bags 12 so that repeated trips to and from a bag storage location are unnecessary. The bag holder 40 further comprises the pair of identical spaced apart rearward supports 42 disposed rearwardly on each upright 22. The rectangular frame 44 is attached to the rearward supports 42. The vertical frame support 46 is disposed centrally within the rectangular frame 44. The vertical frame support 46 aids in bracing the rectangular frame 44 and in preventing any stored bags 12 from unintentional escape. The pair of identical spaced apart axle supports 30 provides one of each of the axle supports 30 disposed rearwardly on one of each of the uprights 22. The axle supports 30 are disposed proximal to the upright bottoms 24. The axle 32 is connected rearwardly to each axle support 30. The axle 32 has two identical spaced apart axle ends 33. An identical wheel 34 is disposed on each of the axle ends 33. Each wheel 34 has a wheel diameter 35 of about 12 inches. Importantly, the axle supports 30 and axle 32 provide that the wheels 34 are disposed outwards and rearwards from bags 12 and other objects carried on the cart 20.

Figure 4:
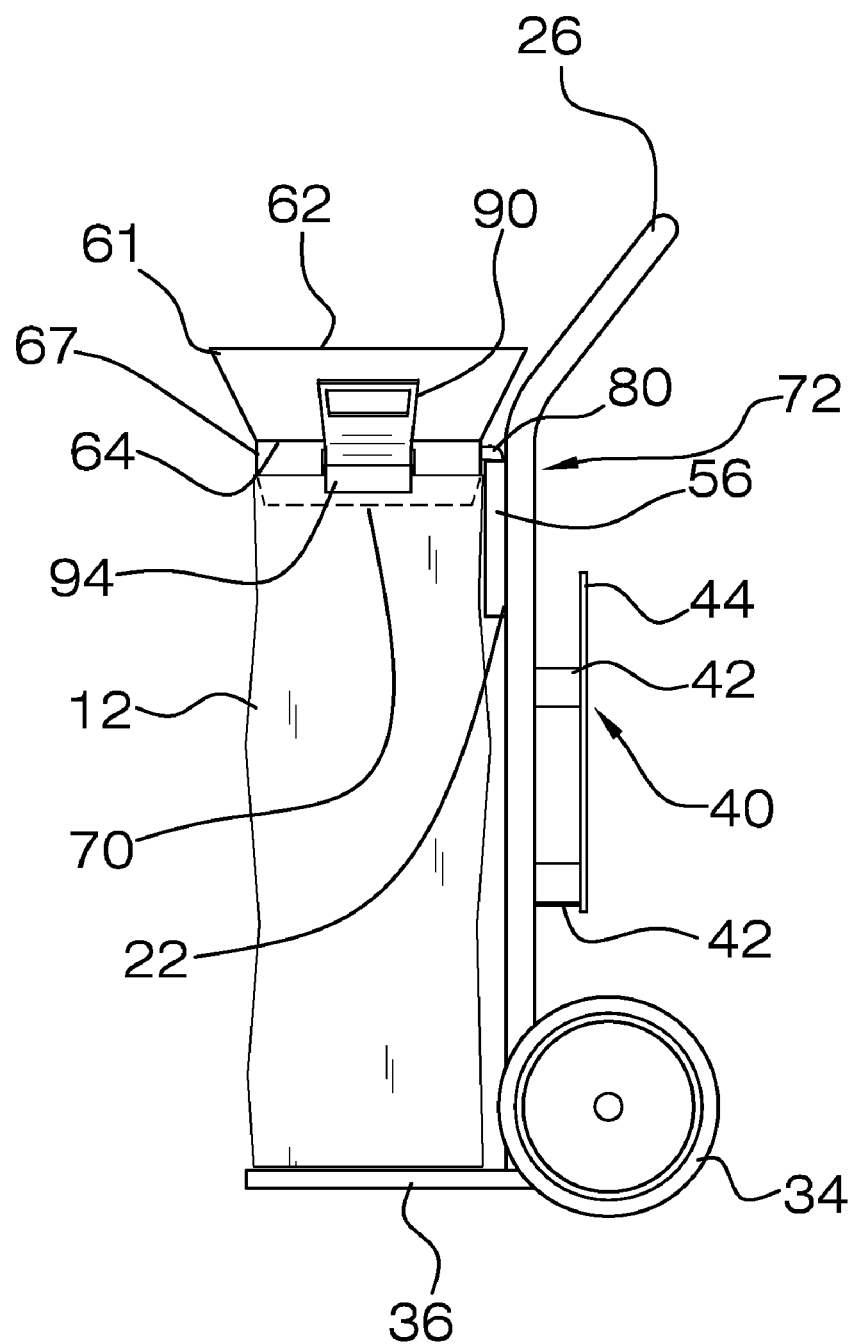
FIG. 4 is a lateral elevation view with bag supported and clamped.

Continuing to refer to FIGS. 1 and 2 and referring also to FIG. 4, the horizontal extended lip 36 is disposed forwardly from the upright bottoms 24. The lip 36 has a lip width 36a of about 17 inches and a lip depth 36b of about 13 inches.

Figure 3:
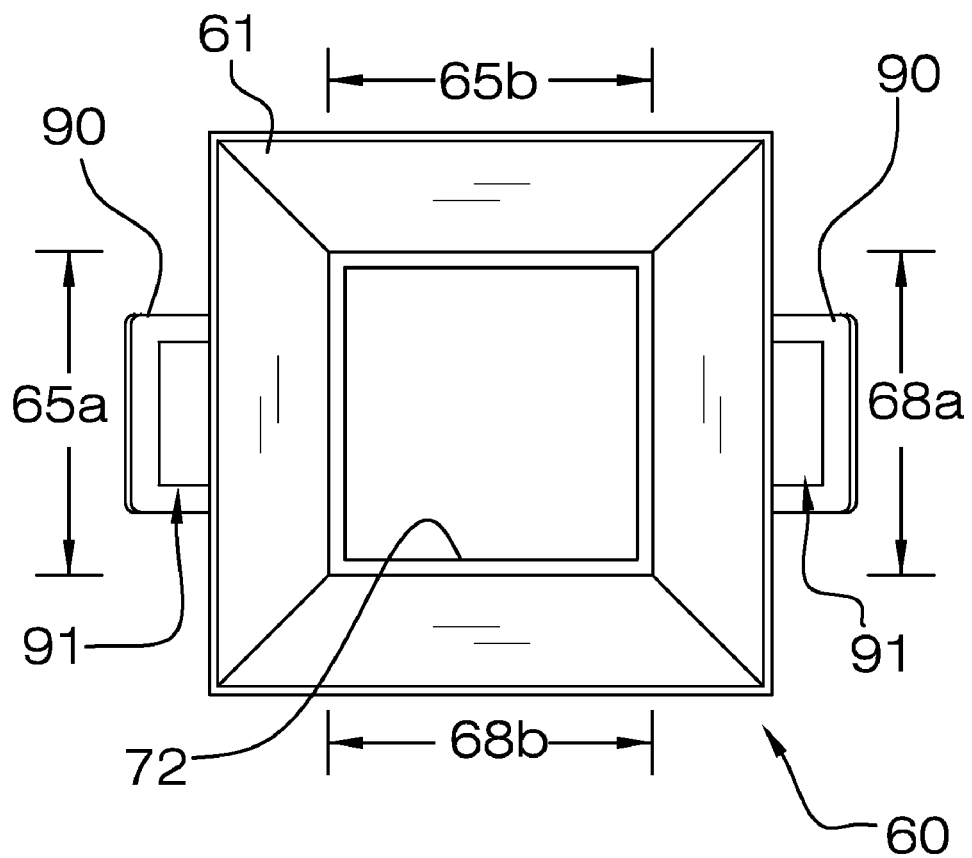
FIG. 3 is a top plan view of the hopper.

Referring again to FIGS. 2 and 4 and also to FIG. 3, the hopper 60 is importantly removably mounted to the cart 20. The hopper 60 comprises the rectangular first funnel 61 having the funnel top 62 spaced apart from the funnel bottom 64, with a top width 62b of about 21½ inches, a top depth 62a of about 11½ inches, a funnel height 63 of about 4¾ inches, a bottom width 65b of about 15¼ inches, and a bottom depth 65a of about 11½ inches. The rectangular funnel base 66 is coplanarly attached to the funnel bottom 64. The funnel base 66 has a base height 67 of about 3 inches, a base width 68b of about 15¼ inches, a base depth 68a of about 11½ inches, and a base rear 69. The inwardly tapered hopper bottom 70 is attached to the funnel base 66. The hopper bottom 70 has a bottom height 72 of about 3 inches. The tapered hopper bottom 70 is important in aiding quick fit of bags 12 to the hopper 60.

Referring again to FIGS. 3 and 4, the pair of identical spaced apart outwardly angled hopper handles 90 is affixed externally to the base width 68b. Each hopper handle 90 further comprises an upwardly disposed handle opening 91. A spring loaded horizontal hinge 92 is disposed below the each handle opening 91. A clamp 94 is disposed below each of the hinges 92. Inward movement of the handle opening 91 releases the clamp 94. Release of the handle opening 91 allows the clamp 94 to grasp an existing bag 12.

Referring again to FIG. 2, the pair of identical spaced apart sleeve mounts 80 is provided. Each sleeve mount 80 has a horizontal member 82 attached to the base rear 69. A downwardly disposed vertical member 84 extends from each horizontal member 82. The vertical members 84 are removably inserted into the cart 20 sleeves 56, thereby providing easy conversion of the cart 20 from a bag specialized cart 20 to a cart 20 capable of carrying a host of other items.

With respect to the above description then, it is to be realized that the optimum dimensional relationships for the parts of the dual purpose wheeled cart apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the dual purpose wheeled cart apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the dual purpose wheeled cart apparatus may be used.

Therefore, the foregoing is considered as illustrative only of the principles of the dual purpose wheeled cart apparatus. Further, since numerous modifications and changes will readily occur to those skilled in the art, it is not desired to limit the dual purpose wheeled cart apparatus to the exact construction and operation shown and described, and accordingly, all suitable modifications and equivalents may be resorted to, falling within the scope of the dual purpose wheeled cart apparatus.

What is claimed is:

1. A dual purposed wheeled cart apparatus, comprising, in combination:
    a portable cart;
    a pair of identical spaced apart uprights of the cart, each upright having an upright top spaced apart from an upright bottom;
    a u-shaped handle disposed upwardly on the upright tops;
    an extended lip disposed perpendicularly to the uprights on the upright bottoms;
    a pair of spaced apart wheels disposed rearwardly and outwardly from the uprights;
    a pair of identical spaced apart sleeves, one of each sleeve disposed inwardly on one of each of the uprights, the sleeves adjacent to the upright tops;
    a hopper having a funnel shape, a funnel top having a top width and a top depth dimension greater than a bottom width and bottom depth dimension, and a rear;
    a pair of identical spaced apart sleeve mounts disposed on the funnel rear, the hopper removably attached to the cart via the sleeve mounts removably inserted into the sleeves;
    wherein the cart further comprises a total width of about 21 inches;
    a total height of about 48 inches;
    wherein each wheel further comprises a wheel diameter of about 12 inches;
    a bag holder affixed rearwardly to the cart uprights; and
    a pair of identical spaced apart hopper handles disposed outwardly on the funnel width, each handle having a clamp for removably holding a bag.

2. A dual purpose wheeled cart apparatus, comprising, in combination:
    a portable cart having a cart height of about 48 inches;
    a pair of identical spaced apart vertical uprights of the cart, each upright having an upright top spaced apart from an upright bottom;
    a rearwardly angled u-shaped handle disposed on the upright tops;
    means for bracing the uprights in relation to each other;
    a pair of identical spaced apart sleeves, one of each sleeve disposed on an interior of one of each of the uprights, the sleeves adjacent to the upright tops;

a bag holder attached rearwardly to the uprights:
  a pair of identical spaced apart rearward supports disposed rearwardly on each upright;
  a rectangular frame attached to the rearward supports;
  a vertical frame support disposed centrally within the rectangular frame;
a pair of identical spaced apart axle supports, one of each of the axle supports disposed rearwardly on one of each of the uprights, proximal to the upright bottoms;
an axle connected rearwardly to each axle support, the axle having two identical spaced apart ends;
an identical wheel disposed on each of the axle ends, each wheel having a wheel diameter of about 12 inches;
a horizontal extended lip disposed forwardly from the upright bottoms;
a hopper removably mounted to the cart, the hopper further comprising:
  a rectangular first funnel having a funnel top spaced apart from a funnel bottom;
  a rectangular funnel base coplanarly attached to the funnel bottom;
  a pair of identical spaced apart outwardly angled hopper handles affixed externally to a base width;
  a spring loaded clamp disposed downwardly on each hopper handle;
  a pair of identical spaced apart sleeve mounts, each sleeve mount having a horizontal member attached to the base rear, a downwardly disposed vertical member, the vertical members removably inserted into the sleeves.

3. The apparatus according to claim 2 wherein the hopper further comprises an inwardly tapered hopper bottom attached to the funnel base, the hopper bottom having a bottom height of about 3 inches.

4. The apparatus according to claim 3 wherein the uprights further comprise an upright height of about 36 inches;
  the angled handle further comprising a handle height of about 12 inches.

5. The apparatus according to claim 2 wherein the uprights further comprise an upright height of about 36 inches;
  the angled handle further comprising a handle height of about 12 inches.

6. A dual purpose wheeled cart apparatus, comprising, in combination:
a cart having a having a cart width of about 21 inches;
a pair of identical spaced apart vertical uprights of the cart, each upright having an upright top spaced apart from an upright bottom, the uprights having an upright height of about 36 inches;
a rearwardly angled u-shaped handle disposed on the upright tops, the angled handle having a handle height of about 12 inches;
a trio of identical spaced apart crossbars disposed between the uprights;
a pair of identical spaced apart sleeves, one of each sleeve disposed on an interior of one of each of the uprights, the sleeves adjacent to the upright tops, each sleeve having a sleeve diameter of about ½ inch;
a bag holder attached rearwardly to the uprights, the bag holder having a holder depth of about 1½ inches and a holder height of about 16 inches, the bag holder further comprising:
  a pair of identical spaced apart rearward supports disposed rearwardly on each upright;
  a rectangular frame attached to the rearward supports;
  a vertical frame support disposed centrally within the rectangular frame;
a pair of identical spaced apart axle supports, one of each of the axle supports disposed rearwardly on one of each of the uprights, proximal to the upright bottoms;
an axle connected rearwardly to each axle support, the axle having two identical spaced apart ends;
an identical wheel disposed on each of the axle ends, each wheel having a wheel diameter of about 12 inches;
a horizontal extended lip disposed forwardly from the upright bottoms, the lip having a lip width of about 17 inches, a lip depth of about 13 inches;
a hopper removably mounted to the cart, the hopper further comprising:
  a rectangular first funnel having a funnel top spaced apart from a funnel bottom, a top width of about 21½ inches, a top depth of about 11½ inches, a funnel height of about 4¾ inches, a bottom width of about 15¼ inches, a bottom depth of about 11½ inches;
  a rectangular funnel base coplanarly attached to the funnel bottom, the funnel base having a base height of about 3 inches, a base width of about 15¼ inches, a base depth of about 11½ inches, a base rear;
  an inwardly tapered hopper bottom attached to the funnel base, the hopper bottom having a bottom height of about 3 inches;
  a pair of identical spaced apart outwardly angled hopper handles affixed externally to the funnel base, each hopper handle further comprising:
    an upwardly disposed handle opening;
    a spring loaded horizontal hinge disposed below the handle opening;
    a clamp disposed below the hinge, whereby an inward movement of the handle opening releases the clamp, a relaxation of the handle opening allows the clamp to grasp an existing bag;
a pair of identical spaced apart sleeve mounts, each sleeve mount having a horizontal member attached to the base rear, a downwardly disposed vertical member, the vertical members removably inserted into the sleeves.

* * * * *